(12) United States Patent
Huang et al.

(10) Patent No.: US 10,961,887 B2
(45) Date of Patent: Mar. 30, 2021

(54) INTEGRATED REDUCTANT MIXER AND HEATER APPARATUS FOR EXHAUST TREATMENT SYSTEMS

(71) Applicant: Deere & Company, Moline, IL (US)

(72) Inventors: Shyan-Cherng Huang, Cedar Falls, IA (US); Danan Dou, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 8 days.

(21) Appl. No.: 16/502,650

(22) Filed: Jul. 3, 2019

(65) Prior Publication Data
US 2021/0003056 A1 Jan. 7, 2021

(51) Int. Cl.
| F01N 3/08 | (2006.01) |
| F02D 41/02 | (2006.01) |
| F01N 3/20 | (2006.01) |

(52) U.S. Cl.
CPC .......... *F01N 3/0807* (2013.01); *F01N 3/208* (2013.01); *F02D 41/0235* (2013.01); *F01N 2240/16* (2013.01); *F01N 2610/1453* (2013.01)

(58) Field of Classification Search
CPC .... F01N 3/0807; F01N 3/208; F01N 2240/16; F01N 2610/1453; F02D 41/0235
See application file for complete search history.

(56) References Cited

U.S. PATENT DOCUMENTS

| 9,464,558 | B2 * | 10/2016 | Tobben | ................. F01N 3/2066 |
| 10,190,463 | B2 * | 1/2019 | Kurpejovic | ........... F01N 3/2066 |
| 10,300,435 | B2 * | 5/2019 | Yoshikawa | ........ B01D 53/9431 |
| 10,598,064 | B2 * | 3/2020 | Everly | .................... F01N 3/027 |
| 10,801,388 | B2 * | 10/2020 | Culbertson | .............. F23J 15/08 |
| 2011/0023461 | A1 * | 2/2011 | Strots | .................... B01F 5/0473 60/286 |
| 2011/0271662 | A1 | 11/2011 | Winsor | |
| 2017/0037799 | A1 | 2/2017 | Balenovic et al. | |
| 2017/0128884 | A1 | 5/2017 | Goffe | |
| 2017/0234189 | A1 * | 8/2017 | Singh | .................... F01N 3/2013 60/274 |
| 2019/0234283 | A1 * | 8/2019 | Adelman | ........... B01D 53/9477 |
| 2019/0388848 | A1 * | 12/2019 | Kurpejovic | ........... F01N 3/2066 |

FOREIGN PATENT DOCUMENTS

GB 2533099 A 6/2016

* cited by examiner

*Primary Examiner* — Jesse S Bogue
(74) *Attorney, Agent, or Firm* — Klintworth & Rozenblat IP LLP

(57) ABSTRACT

An integrated reductant mixer and heater apparatus for an exhaust treatment system is provided. The apparatus includes a housing for an exhaust stream to flow therethrough in an axial flow direction; a reductant injector configured to deliver a spray of reductant into the exhaust stream; at least one mixing fin disposed within the housing interior downstream of the reductant injector, the mixing fin having a primary deflection surface orientated parallel with, or at an acute angle relative to, the axial flow direction; a first heater element within the housing interior and extending within a first plane intersecting the axial flow direction proximate the primary deflection surface of the mixing fin; and a second heater element within the housing interior and extending within a second plane intersecting the axial flow direction proximate the primary deflection surface of the mixing fin and downstream from the first heater element.

13 Claims, 6 Drawing Sheets

US 10,961,887 B2

INTEGRATED REDUCTANT MIXER AND HEATER APPARATUS FOR EXHAUST TREATMENT SYSTEMS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to exhaust treatment systems and methods for a work vehicle.

BACKGROUND OF THE DISCLOSURE

Heavy work vehicles, such as used in the construction, agriculture and forestry industries, typically include a power system with an internal combustion engine in the form of a compression ignition engine (i.e., diesel engine) or a spark ignition engine (i.e., gasoline engine). For many heavy work vehicles, the power system includes a diesel engine that may have higher lugging, pull-down, and torque characteristics for associated work operations. Such power systems may further include a treatment system to reduce emission levels of particulates and nitrogen oxides (NOx) in the engine exhaust.

SUMMARY OF THE DISCLOSURE

The disclosure provides an exhaust treatment system and method for a power system of a work vehicle.

In one aspect, the disclosure provides an integrated reductant mixer and heater apparatus for an exhaust treatment system. The apparatus includes a housing having a housing wall that defines a housing interior for an exhaust stream to flow therethrough in an axial flow direction coaxial with the housing interior; a reductant injector coupled to the housing and configured to deliver a spray of reductant into the exhaust stream; at least one mixing fin disposed within the housing interior downstream of the reductant injector, the mixing fin having a primary deflection surface orientated parallel with, or at an acute angle relative to, the axial flow direction; a first heater element within the housing interior and extending within a first plane intersecting the axial flow direction proximate the primary deflection surface of the mixing fin; and a second heater element within the housing interior and extending within a second plane intersecting the axial flow direction proximate the primary deflection surface of the mixing fin and downstream from the first heater element.

In another aspect, the disclosure provides an exhaust treatment system for treating exhaust from an engine. The system includes an inlet tube for receiving the exhaust from the engine; a particulate filter fluidly coupled to receive the exhaust from the inlet tube; and a selective catalytic reduction system coupled to receive the exhaust from the particulate filter. The selective catalytic reduction system includes an integrated reductant mixer and heater housing having a housing wall that defines a housing interior for an exhaust stream to flow therethrough in an axial flow direction coaxial with the housing interior; a reductant injector coupled to the housing and configured to deliver a spray of reductant into the exhaust stream; at least one mixing fin disposed within the housing interior downstream of the reductant injector, the mixing fin having a primary deflection surface orientated parallel with, or at an acute angle relative to, the axial flow direction; a first heater element within the housing interior and extending within a first plane intersecting the axial flow direction proximate the primary deflection surface of the mixing fin; and a second heater element within the housing interior and extending within a second plane intersecting the axial flow direction proximate the primary deflection surface of the mixing fin and downstream from the first heater element. The system further includes a catalyst device fluidly coupled to receive the mixture of the reductant and the exhaust from the integrated reductant mixer and heater housing and configured to reduce NOx in the exhaust with the reductant and an outlet tube coupled to receive the exhaust from the selective catalytic reduction system.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
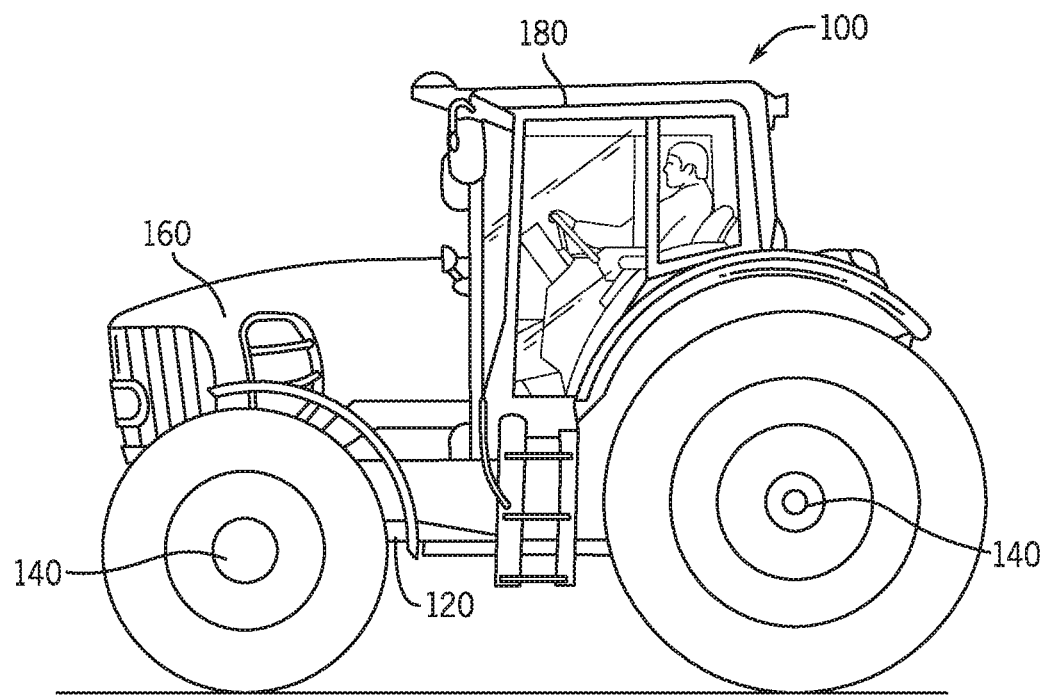
FIG. 1 is a side view of an example work vehicle in the form of a tractor in which an exhaust treatment system and method may be used in accordance with this disclosure.

The following describes one or more example embodiments of the disclosed exhaust treatment system and method, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "downstream," "upstream," "longitudinal," "radial," "axial," and "circumferential," may be used. Such terms are defined, at least in part, with respect to an annular decomposition tube, an annular integrated reductant mixer and heater apparatus, and/or the direction of the exhaust flowing therethrough. Additional reference will be made to "x", "y", and "z" directions and/or orientations of a Cartesian coordinate system.

As noted, work vehicles may include power systems with diesel engines to produce torque in a wide range of applications, such as long-haul trucks, tractors, agricultural or construction vehicles, surface mining equipment, non-electric locomotives, stationary power generators and the like. During the combustion process, diesel engines may generate particulates, nitrogen oxides (NOx), and other types of pollutants that are subject to increasingly strict emissions standards. As such, engine and equipment manufacturers have developed systems for reducing the levels of pollutants released into the environment. For example, some work vehicles utilize an exhaust treatment system, such as a Selective Catalytic Reduction (SCR) system to reduce NOx emissions from diesel engine exhaust. In one example of an SCR exhaust treatment system, NOx is reacted with reductant compounds such as ammonia to generate reduced forms of nitrogen and other, less harmful components.

The reductant compounds used in exhaust treatment systems are typically stored as liquids and may be referred to as "Diesel Exhaust Fluid" (DEF). In one example, the reductant is a mixture of urea and demineralized water that is sprayed into the exhaust flow path to be converted into ammonia and mixed with engine exhaust for NOx reduction. It is beneficial for the exhaust and reductant mixture to maintain at least a minimum temperature to enhance the desired chemical reactions and emission reduction functions of the exhaust treatment systems. When exhaust temperature is low (e.g., less than 200° C.), the thermolysis of DEF is slow and incomplete. Moreover, in addition to failing to adequate reduce pollutants, incomplete reactions of urea and associated derivatives may form undesirable deposits within the system, thereby increasing pressure drop and reducing availability of the ammonia.

As described herein, the exhaust treatment system may include an integrated reductant mixer and heater apparatus to enhance the reductant conversion and to reduce NOx and other pollutants within the exhaust path. As described below, the integrated reductant mixer and heater apparatus is provided as part of the SCR system and includes 1) at least first and second heater elements extending across the exhaust flow path to heat the exhaust and 2) mixing elements overlapping with or immediately downstream of the heater elements to enhance heat distribution within the exhaust flow and advantageously mix the reductant within the exhaust flow. As such, the integrated reductant mixer and heater apparatus is configured to provide the following functions: (1) distribute heat from heater elements evenly across the entire flow cross-section; (2) break up reductant droplets to accelerate thermolysis reaction to ammonia; and (3) promote uniform ammonia and reductant distribution by turbulent mixing.

As described below, the integrated apparatus includes a heater section with two or more heater elements arranged across the flow path to uniformly heat the exhaust. The heater elements may be electric heater elements and have any suitable shape, including wave shapes that may be aligned with one another or staggered relative to one another and/or spiral shapes that may be aligned with one another or staggered relative to one another. In some examples, a controller may be provided to modulate the operational characteristics of the heater elements. The integrated apparatus further includes a mixing section with mixing fins forming deflection surfaces that overlap with the heater elements or that are arranged immediately downstream of the heater elements to generate turbulent exhaust flow.

The following describes one or more example implementations of the disclosed systems and methods for improving the effectiveness of an exhaust treatment system as compared to conventional systems. Discussion herein may sometimes focus on the example application of an exhaust treatment system in a tractor, but the exhaust treatment system is applicable to other types of work vehicles and/or other types of engine systems.

Referring to FIG. 1, in some embodiments, the disclosed exhaust treatment systems and methods may be used with a work vehicle 100. As shown, the work vehicle 100 may be considered to include a main frame or chassis 120, a drive assembly 140, a power system 160, and an operator platform or cabin 180. As is typical, the power system 160 includes an internal combustion engine used for propulsion of the work vehicle 100 via the drive assembly 140 based on commands from an operator in the cabin 180. The work vehicle 100 may include any number of additional or alternative systems, subsystems, and elements.

During operation, the internal combustion engine of the power system 160 generates exhaust. As such, the power system 160 further includes an exhaust treatment system that functions to reduce pollutants prior to emission of the engine exhaust into the atmosphere. Additional details about the exhaust treatment system will be provided with reference to FIGS. 2-7B.

Figure 2:
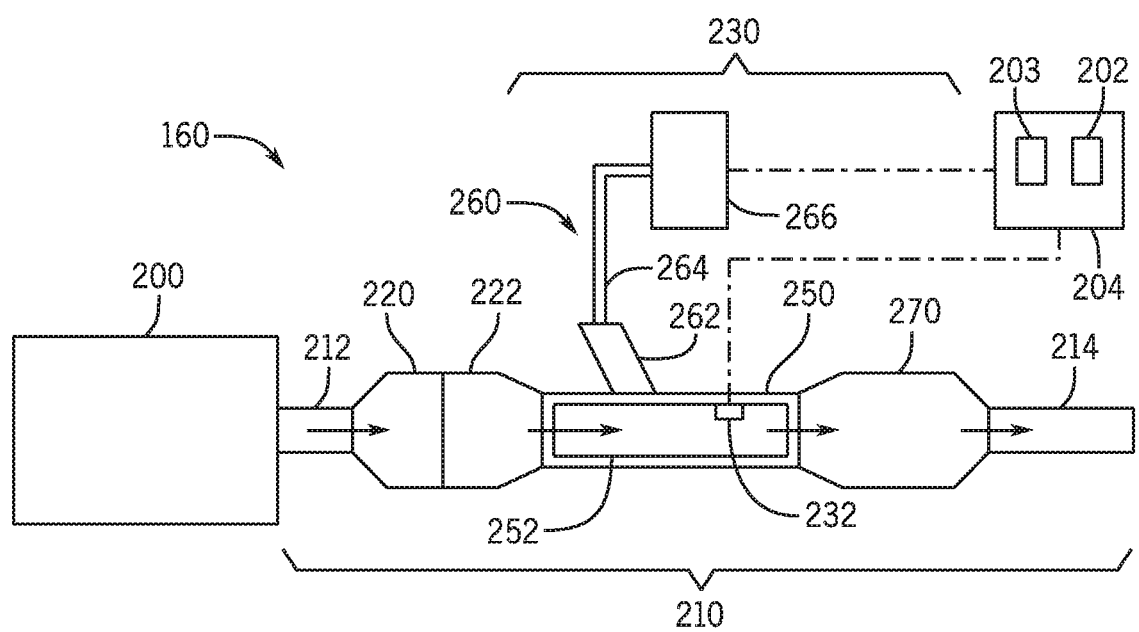
FIG. 2 is a functional block diagram of an exhaust treatment system in accordance with an example embodiment.

Referring to FIG. 2 and as introduced above, the power system 160 includes an internal combustion engine 200 and an exhaust treatment system 210. Generally, the engine 200 may be any kind of internal combustion engine that produces an exhaust gas, such as a gasoline engine, a diesel engine, a gaseous fuel burning engine (e.g., natural gas) or any other exhaust producing engine. As an example, the engine 200 described below is a diesel engine. The engine 200 may be of any size, with any number cylinders, and in any configuration. The engine 200 may include other features not shown, such as controllers, fuel systems, air systems, cooling systems, peripheries, drivetrain components, turbochargers, exhaust gas recirculation systems, etc.

The exhaust treatment system 210 is oriented downstream of the engine 200 to receive the exhaust. In one example, the exhaust treatment system 210 includes an inlet tube 212, diesel oxidation catalyst (DOC) 220, a diesel particulate filter (DPF) 222, a selective catalytic reduction (SCR) system 230, and an outlet tube 214. Generally, the exhaust from the engine 200 flows through the inlet tube 212, the DOC 220, the DPF 222, and the SCR system 230, and is expelled through the outlet tube 214, which may be the tailpipe of the vehicle 100 (FIG. 1).

In some examples, the exhaust treatment system 210 may also include a controller 202 that facilitates implementation of the functions described herein. The controller 202 may be on-board, remote, or a combination thereof and further may be a considered a vehicle controller, an exhaust treatment system controller, and/or one or more dedicated controllers for one or more of the components discussed herein. Generally, the controller 202 may include any suitable type of processor 203 and memory 204 containing instructions executable by the processor 203 to carry out the various functions described herein. The controller 202 may be configured as a hard-wired computing circuit (or circuits), a programmable circuit, a hydraulic controller, an electrical controller, an electro-hydraulic controller, or otherwise. As such, the controller 202 may be configured to execute various computational and control functionality with respect to the exhaust treatment system 210. In some embodiments, the controller 202 may be configured to receive input signals in various formats (e.g., as hydraulic signals, voltage signals, current signals, and so on) and to output command signals in various formats (e.g., as hydraulic signals, voltage signals, current signals, mechanical movements, and so on). More specific functions of the controller 202 are described below.

The DOC 220 may be configured in a variety of ways and contain catalyst materials useful in collecting, absorbing, adsorbing, and/or converting hydrocarbons, carbon monoxide, and/or nitrogen oxides (NOx) contained in the exhaust. Such catalyst materials may include, for example, aluminum, platinum, palladium, rhodium, barium, cerium, and/or alkali metals, alkaline-earth metals, rare-earth metals, or combinations thereof. In some examples, the DOC 220 may be omitted.

The DPF 222 may be any of various particulate filters known in the art configured to reduce particulate matter concentrations, e.g., soot and ash, in the exhaust. Any structure capable of removing particulate matter from the exhaust of the engine 200 may be used. For example, the DPF 222 may include a wall-flow ceramic substrate having a honeycomb cross-section constructed of cordierite, silicon carbide, or other suitable material to remove the particulate matter. In some examples, the DPF 222 may be omitted.

Generally, the SCR system 230 functions to reduce the amount of NOx in the exhaust flow. In one example, the SCR system 230 includes a decomposition tube 250, a reductant delivery mechanism 260, and an SCR catalyst device 270. As described below, the decomposition tube 250 may include, or otherwise be incorporated (or replaced) with, an integrated reductant mixer and heater apparatus 252.

The reductant delivery mechanism 260 is controllable (e.g., based on commands from the controller 202) to selectively inject an amount of reductant into the flow of exhaust within the decomposition tube 250. In one example, the reductant is diesel emissions fluid (DEF) that is a solution of urea and deionized water, such as 32.5% high purity urea and 67.5% deionized water, although other reductant solutions may be used.

In one example, the reductant delivery mechanism 260 includes a reductant injection assembly 262 fluidly coupled to receive the reductant from a reductant tank 266 via conduit 264. The reductant tank 266 stores the reductant in liquid form for transfer to the injection assembly 262. Although not shown, the delivery mechanism 260 may include, as examples, any suitable valves, orifices, sensors, pumps, heating and/or cooling elements, control elements, and/or other components to facilitate delivery of the reductant to the decomposition tube 250.

As described in greater detail below, the decomposition tube 250, in particular the integrated reductant mixer and heater apparatus 252, facilitates the heating and mixing of the reductant and the exhaust. In one example, upon injection of the liquid reductant, the reductant evaporates and the urea decomposes or hydrolyzes in the decomposition tube 250 to produce ammonia, which is mixed with the exhaust flow upstream of the SCR catalyst device 270. In some examples, aspects of operation of the decomposition tube 250, the apparatus 252, and delivery mechanism 260 may be controlled based on commands from controller 202.

The SCR catalyst device 270 may include any of various catalysts known in the art disposed on a substrate. In the SCR catalyst device 270, the ammonia reacts with NOx to reduce the NOx into less harmful emissions, such as $N_2$ and $H_2O$. As examples, the SCR catalyst device 270 may include a vanadium-based catalyst or mixed metal oxides, or the SCR catalyst device 270 may include a zeolite-based catalyst, such as a Cu-zeolite or a Fe-zeolite As described in greater detail below, the SCR system 230 may include one or more sensors 232 (schematically shown) to collect information regarding exhaust characteristics, including temperature sensors to collect temperature information. The sensor information may be provided to the controller 202, and in response, the controller 202 may implement one or more schedules or programs that function to modify one or more operational aspects of the SCR system 230, as discussed in greater detail below.

Although not shown, the SCR system 230 and the overall exhaust treatment system 210 may include any suitable elements that facilitate operation. For example, the treatment system 210 may include elements such as an ammonia oxidation catalyst (AOC) that further reacts the ammonia to produce nitrogen. After treatment, the exhaust is vented into the atmosphere through the outlet tube 214. Additional details about the integrated reductant mixer and heater apparatus 252 will be provided below in the discussion of FIGS. 3-7B.

Figure 3:
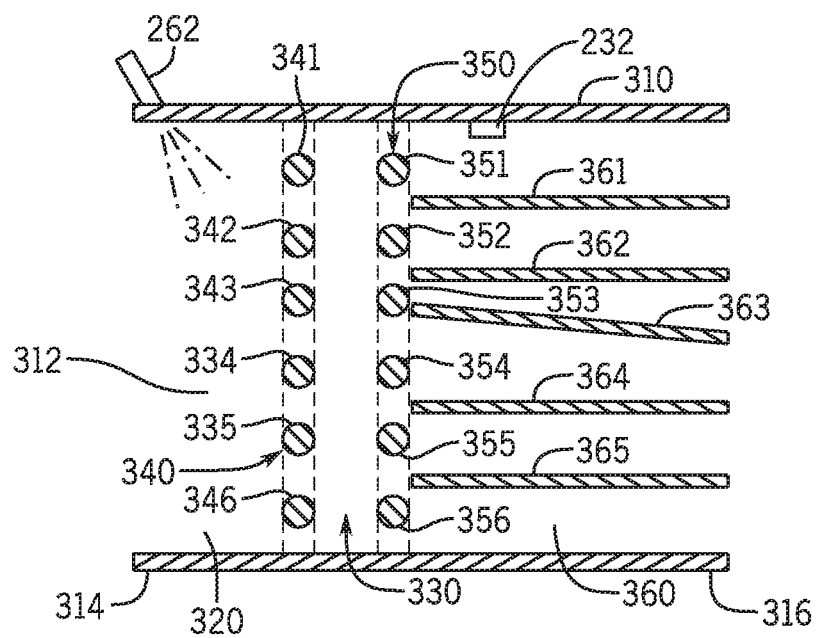
FIG. 3 is a schematic cross-sectional view of an integrated reductant mixer and heater apparatus of the exhaust treatment system of FIG. 2 in accordance with an example embodiment.

FIG. 3 is a schematic cross-sectional view of an integrated reductant mixer and heater apparatus 252 that may be implemented into the SCR system 230 of FIG. 2 upstream of the SCR catalyst device 270 in accordance with an example embodiment. The integrated reductant mixer and heater apparatus 252 includes a housing 300 formed by a generally cylindrical wall 310. The housing wall 310 defines a flow path 312 for the exhaust and extends between an upstream end 314 and a downstream end 316. As previously noted in the description of FIG. 2, the integrated reductant mixer and heater apparatus 252 may be associated with the decomposition tube 250 and arranged between other components of the exhaust treatment system 210, such as between the DPF 222 at the upstream end 314 and the SCR catalyst device 270 at the downstream end 316. Although cylindrical in the examples discussed herein, other examples may have other cross-sectional shapes, such as square, rectangular, oval, and the like.

The decomposition tube 250 and/or integrated reductant mixer and heater apparatus 252 may be considered to have a dosing section 320 (schematically shown in FIG. 3), a heating section 330, and a mixing section 360. The integrated reductant mixer and heater apparatus 252 generally functions to increase the temperature of the exhaust gas (and the reductant), distribute the heat across the exhaust flow, and encourage mixing of the exhaust gas and reductant, thereby enhancing subsequent reactions to reduce the NOx.

In this example, the dosing section 320 is upstream of the heating section 330 and/or mixing section 360, although the order of the various sections and components described herein may vary. The housing wall 310 of sections 320, 330, 360 may be formed by a unitary (or single) wall or by multiple wall portions that collectively form the flow path 312. In the depicted embodiments, two or more of the sections 320, 330, 360 are generally coincident with one another such that the section 320, 330, 360 have generally the same diameter, although other configurations are possible.

Generally, in the dosing section 320, the injection assembly 262 of the reductant delivery mechanism 260 (FIG. 2) is arranged to introduce the reductant into the exhaust in the flow path 312, such as by delivering a spray of liquid reductant into the integrated reductant mixer and heater apparatus 252. This pattern may be a stream, conical spray pattern, or other pattern and may be impacted by a number of factors, including by the orientation of the nozzle and the nature of the generally cross-flowing exhaust.

As shown in the view of FIG. 3, the heating section 330 of the apparatus 252 is immediately downstream of the dosing section 320. In one example, the heating section 330 includes a first heater element 340 and a second heater element 350 positioned in relatively close proximity with one another with the second heater element 350 being immediately downstream of the first heater element 340. The heater elements 340, 350 intersect the flow path across respective axial-radial planes of the flow path 312 within the housing wall 310. In particular, the first heater element 340 has a number of first heater element portions 341-346 extending across the flow path 312, and the second heater element 350 has a number of second heater element portions 351-356 extending across the flow path 312. Additional details regarding the heater elements are discussed below.

Generally, the heater elements 340, 350 may have any suitable shape, arrangement, and/or configuration to uniformly heat the exhaust flow. For example, the heater elements 340, 350 are configured to effectively intercept substantially all of the exhaust flow. Example shapes of the heater elements 340, 350 discussed below include wave (or convoluted or sinusoidal) shapes and spiral shapes.

Any type of heater element 340, 350 may be provided. In one example, the heater elements 340, 350 are electrical devices that use electric current to heat the respective element (e.g., as an electrical resistor). The temperatures of such heater elements 340, 350 may be modulated by the controller 202 (FIG. 2).

As also shown in FIG. 3, the mixing section 360 is immediately downstream and proximate to the heater elements 340, 350. Generally, the mixing section 360 provides at least one mixing fin 361-365 that functions as one or more primary deflection surfaces to distribute the heated exhaust and to more thoroughly mix the exhaust flow and reductant. The primary deflection surfaces are oriented parallel to, or an acute angle relative to, the axial flow direction of the exhaust flow. Although the example of FIG. 3 depicts the mixing fins 361-365 as being completely downstream of the heater elements 340, 350, all or portions of the mixing fins 361-365 may radially intersect relative to the positional plane of one or both of the heater elements 340, 350, as shown in some of the examples discussed below.

In the example of FIG. 3, five (5) mixing fins 361-365 are provided. A number of the mixing fins 361, 362, 364, 365 are oriented parallel to the axial flow direction of the exhaust, and one of the mixing fins 363 is oriented at an acute angle relative to the axial flow direction of the exhaust. Any number, any length, and any orientation of mixing fins 361-365 may be provided.

The mixing fins 361-365 may have any suitable shape, arrangement, and/or configuration to distribute the heated exhaust flow and to mix reductant and exhaust flow. Generally, the collection of mixing fins 361-365 may effectively span the cross-sectional area of the flow path, although other arrangements may be provided. Functionally, the mixing fins 361-365 are disposed along the flow path to create turbulence, thereby more evenly mixing and distributing the heated exhaust flow and the ammonia within the exhaust flow upstream of the SCR catalyst device 270 (FIG. 2). In addition to the distribution of the heated exhaust flow, evenly distributing the ammonia into the exhaust stream improves the efficiency of the SCR system 230 and may also reduce the amount of reductant that is needed to achieve maximum efficiency. In some examples, alternative and/or additional heater and/or mixing elements may be provided.

As an integrated unit, the reductant mixer and heater apparatus 252 provides a reduced pressure drop penalty relative to other configurations. In particular, since the sections 320, 330, 360 share the similar geometry, the pressure drop is less than separately designed sections.

As noted above, the reductant mixer and heater apparatus 252 may include one or more sensors 232 positioned at one or more locations to collect temperature information, as an example. Although one example location (downstream of the heater elements 340, 350) is depicted in FIG. 3, further, example locations include upstream of the heater elements 340, 350, on one or both of the heater elements 340, 350, in between the heater elements 340, 350, downstream the mixing fins 361-364, and/or on the mixing fins 361-365. The sensors 232 provide the temperature information to the controller 202 to enable an active control of the reductant mixer and heater apparatus 252, particularly the heater elements 340, 350. In response, the heater elements 340, 350 may be modulated (commanded to increase or decrease temperature) to perform the following functions: (1) increase exhaust temperature uniformly over the cross-section to accelerate downstream SCR reaction mechanisms during cold start; (2) elevate mixer temperature in the reductant impingement area to reduce urea deposit risks, and to periodically remove urea deposits by thermal decomposition as needed; (3) periodically increase temperature to promote active soot regeneration for downstream filters; and (4) periodically raise temperature to thermally remove SOx from downstream elements. In addition, the heater elements 340, 350 may be modulated to protect against overheating above material limits. As noted above, the controller 202 (FIG. 2) may store and implement command schedules to perform these functions.

Figure 4A:
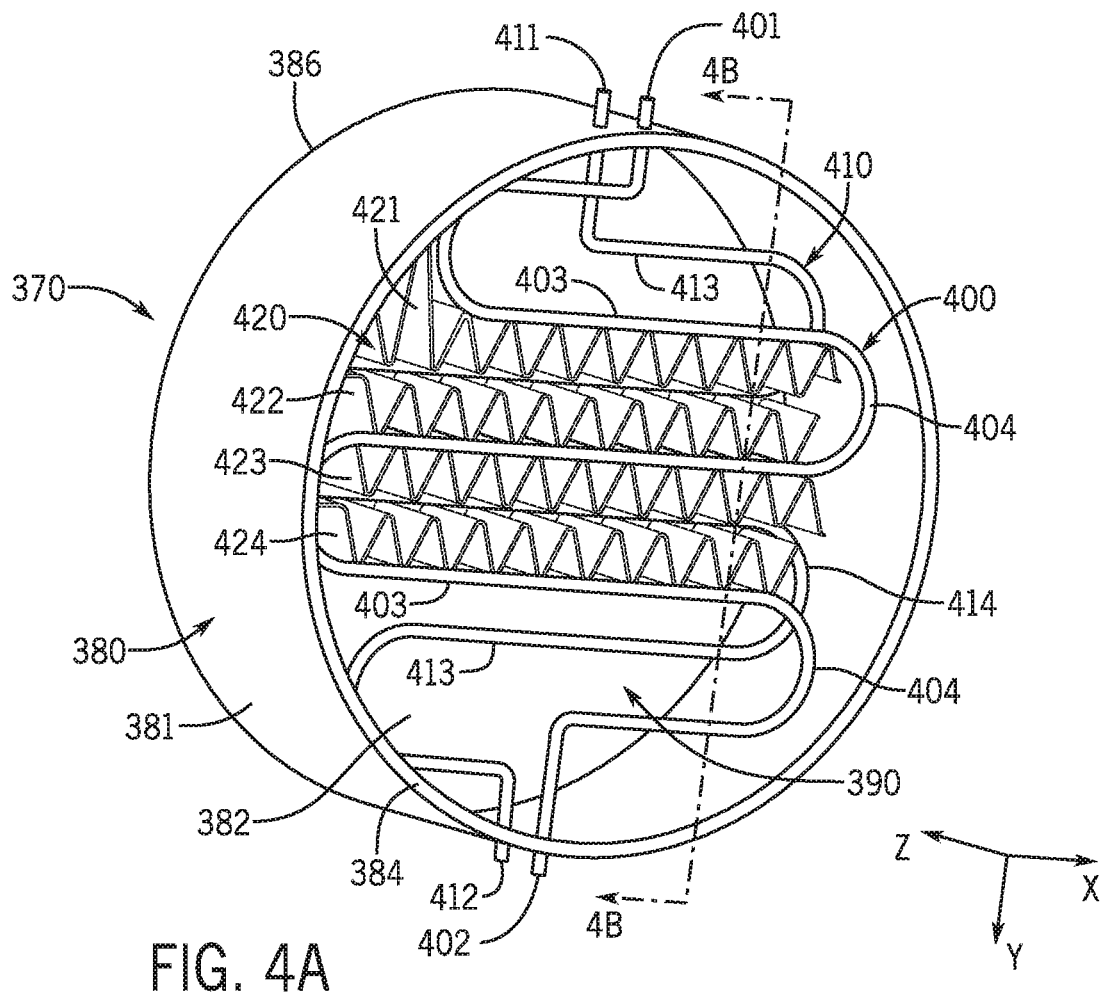
FIGS. 4A, 4B, and 4C are isometric views of aspects of an integrated reductant mixer and heater apparatus of the exhaust treatment system of FIG. 2 in accordance with another example embodiment.
Figure 4B:
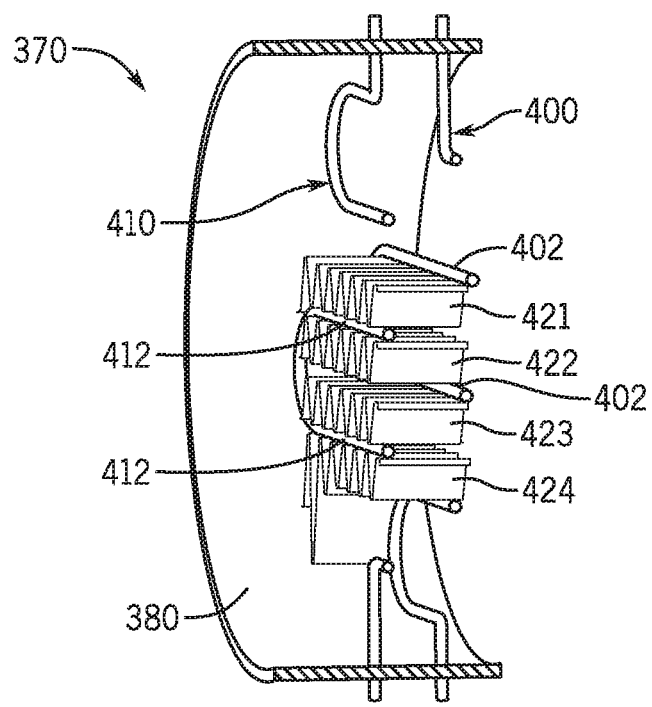
Figure 4C:
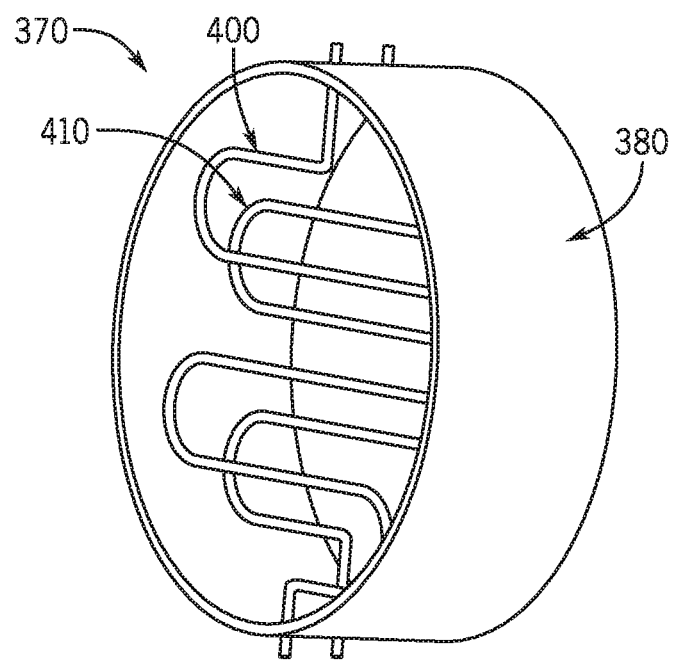

FIGS. 4A-4C are isometric views of an integrated reductant mixer and heater apparatus 370 that may be incorporated into the various exhaust treatment systems discussed herein. As shown, the integrated reductant mixer and heater apparatus 370 includes a housing 380, a heating section 390 with a plurality of heater elements 400, 410, and a mixing section 420 with one or more mixing fins 421-424. In the view of FIG. 5, the dosing section has been removed for clarity.

Generally, the view of FIG. 4A is an end isometric view; the view of FIG. 4B is a cross-sectional isometric view; and the view of FIG. 4C is a partial end isometric view with the mixing fins 421-424 removed for clarity. As referenced in FIG. 4A, the integrated reductant mixer and heater apparatus 370 may be described relative to an xyz-coordinate system in which the z-axis is parallel to an axial orientation and the x axis and y axis are parallel to the z-axis and each other.

As shown, the housing 380 is formed by a cylindrical wall 381 defining flow path 382 with an upstream end 384 and a downstream end 386. The first heater element 400 is mounted with an upstream position relative to the downstream heater element 410. The first heater element 400 has heater element ends 401, 402 formed by radial portions that extend through the wall 381 of the housing 380. In this example, the first heater element 400 includes a series of straight portions 403 and curves 404 forming a serpentine shape between the ends 401, 402. As shown, the curves 404 are positioned generally proximate to the inner surface of the housing wall 392. The first heater element 400 extends across effectively the entire exhaust flow path 382 at the respective axial position.

The second heater element 410 has a generally similar shape as the first heater element 400. The second heater element 410 has second heater element ends 411, 412 formed by radial portions that extend through the wall 381 of the housing 380. The second heater element 410 includes a series of straight portions 413, each extending with a length along the x-orientation, and curves 414, each joining the ends of the straight portions 413 to one another and/or straight portions to respective ends 411, 412, thereby forming a serpentine shape with the collection of straight portions 413 and curved portions 414 extending along the y-orientation. As shown, the curves 414 are positioned generally proximate to the inner surface of the housing wall 392. The second heater element 410 extends across effectively the entire exhaust flow path 382 at the respective axial position.

Generally, the heater elements 400, 410 may have any suitable shape to extend across the flow path 382. The heater elements 400, 410 of FIGS. 4A-4C may be considered to be "wave-shaped". As best shown by FIG. 4B, the respective straight portions 403 and curves 404 of the first heater element 400 are radially offset relative to the respective straight portions 403 and curves 404 of the second heater element 410 in an axial direction. As such, the heater elements 400, 410 may be collectively considered "staggered wave shapes".

The heater elements 400, 410 may be any suitable type of heating structures. In one example, the heater elements 400, 410 are electric heaters in which resistance to a current that operates to increase the temperature of the heating structures.

As noted above, the mixing section 420 is formed by a number of mixing fins 421-424. In this example, each of the mixing fins 421-424 is formed by an undulating, wave-type structure with a length extending along the x-orientation across the flow path 382 with the "undulations" of the mixing fins 421-424 extending along the y-orientation. In this example, the mixing fins 421-424 extend in an axial direction (or z-direction) from an upstream position proximate to the axial plane of the first heater element 400 to a downstream position proximate to the axial plane of the second heater element 410. In effect, the mixing section 420 overlaps with the heating section 390 in this example.

In this example, the mixing fins 421-424 are sized in the y-orientation to fit between a respective straight portion 403 of the first heater element 400 and a respective straight portion 413 of the second heater element 410. As such, considering the staggered nature of the heater elements 400, 410, two mixing fins 421-424 are arranged between adjacent straight portions 403, 413 of a single heater element 400, 410, although other arrangements may be provided.

Figure 5A:
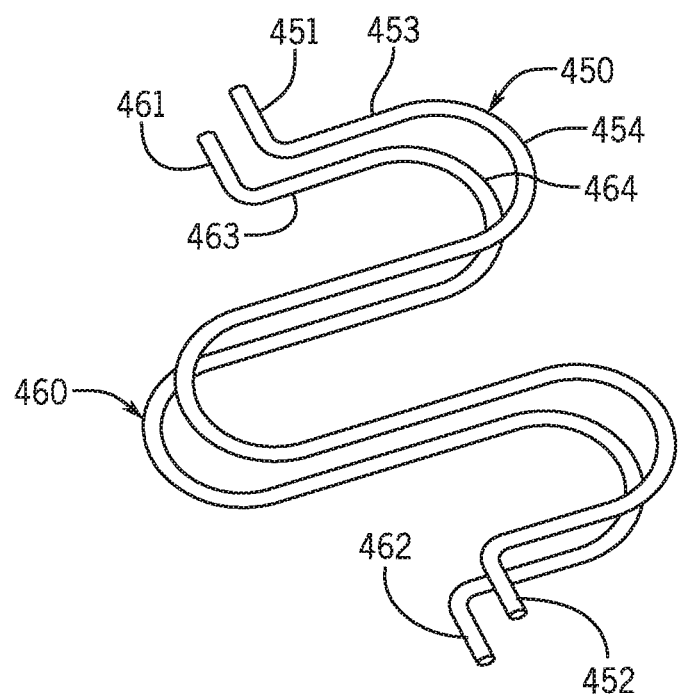
FIGS. 5A and 5B are views a set of heater elements associated with the integrated reductant mixer and heater apparatus of the exhaust treatment system of FIG. 2 in accordance with an example embodiment.
Figure 5B:
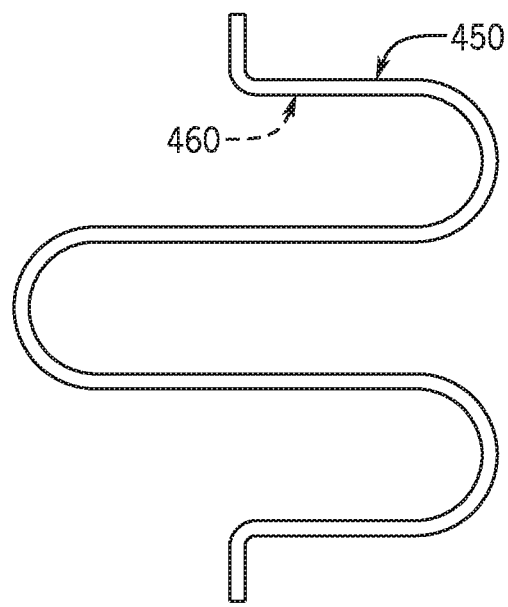

FIGS. 5A, 5B; 6A, 6B; and 7A, 7B depict additional examples of heater elements 450, 460, 470, 480, 490, 500 that may be incorporated into the integrated reductant mixer and heater apparatus discussed herein.

Reference is initially made to FIGS. 5A and 5B that depict first and second heater elements 450, 460 similar to the heater elements 400, 410 depicted in FIGS. 4A, 4B, and 4C. In particular, each of the first and second heater elements 450, 460 are formed by straight portions 453, 463 and curves 454, 464 extending between ends 451, 452; 461, 462. However, as best shown by the end view of FIG. 5B, and in contrast to the heater elements 400, 410 of FIGS. 4A-4C, the first and second heater elements 450, 460 in this example are aligned with one another along the axial flow direction. As such, the heater elements 450, 460 of FIGS. 5A and 5B may be considered "aligned waves".

Figure 6A:
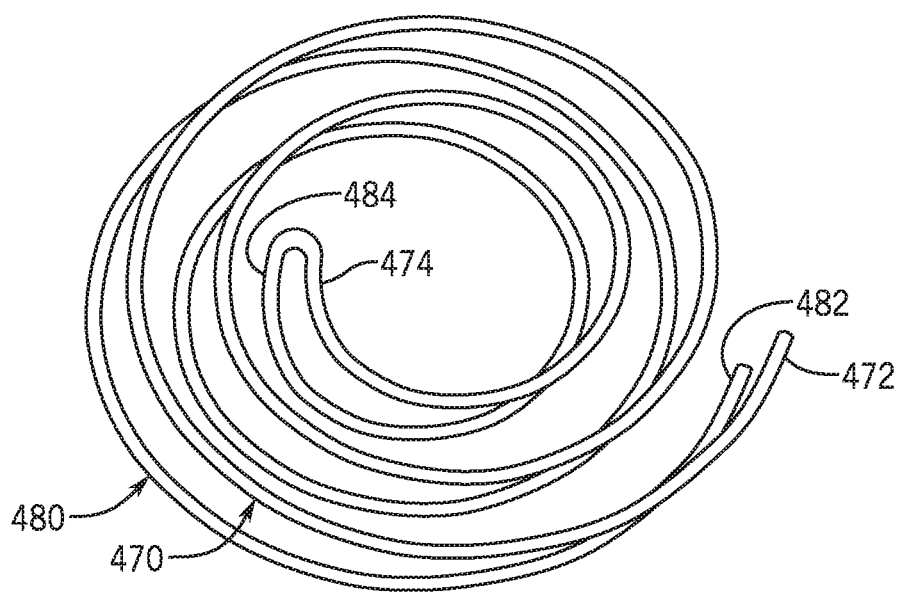
FIGS. 6A and 6B are views a set of heater elements associated with the integrated reductant mixer and heater apparatus of the exhaust treatment system of FIG. 2 in accordance with another example embodiment.
Figure 6B:
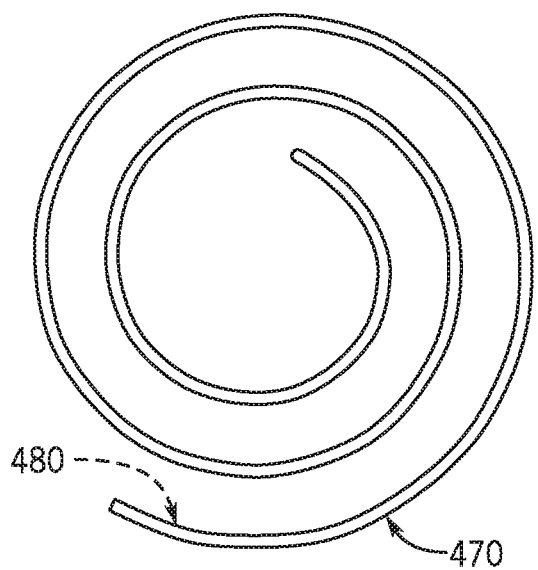

With reference to FIGS. 6A and 6B, the heater elements 470, 480 may be in the form of spirals, each extending between a respective outer end 472, 482 and a respective inner end 474, 484. In this example, the inner ends 474, 484 of the heater elements 470, 480 are joined together. Additionally, the spiral shapes of the first and second heater elements 470, 480 are aligned with one another along the axial direction. As such, the heater elements 470, 480 may be considered "joined spirals" or "aligned spirals".

Figure 7A:
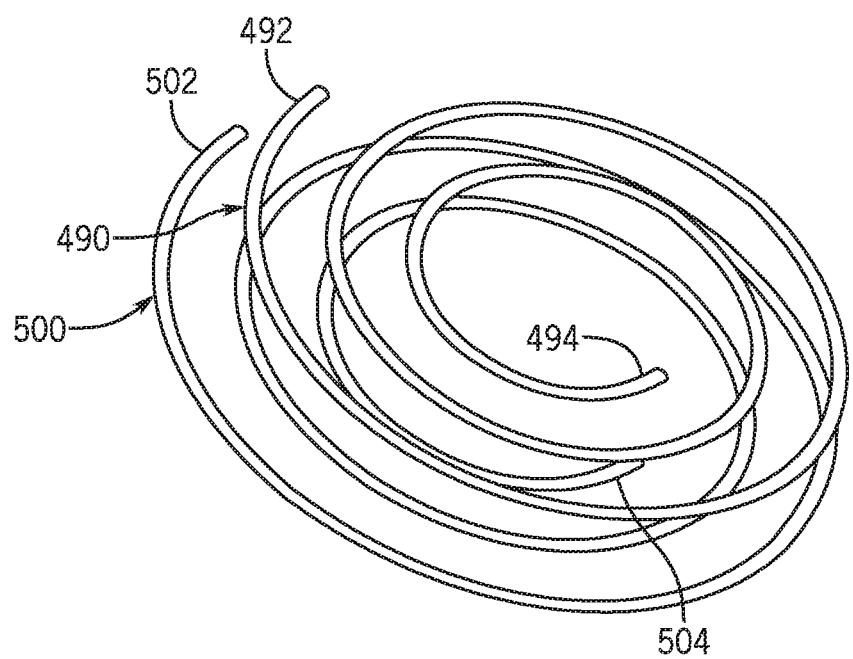
FIGS. 7A and 7B are views a set of heating elements associated with the integrated reductant mixer and heater apparatus of the exhaust treatment system of FIG. 2 in accordance with a further example embodiment.
Figure 7B:
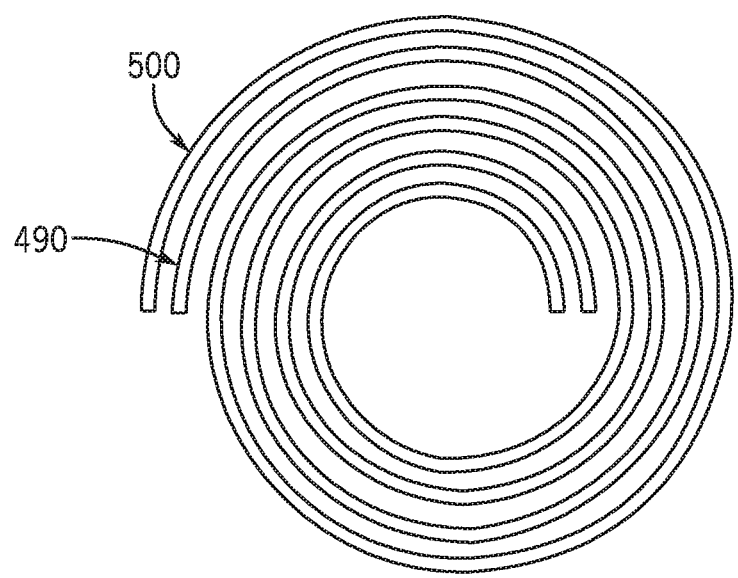

With reference to FIGS. 7A and 7B, the heater elements 490, 500 may be in the form of spirals, each extending between a respective outer end 492, 502 and a respective inner end 494, 504. In this example, the inner ends 494, 504 of the heater elements 490, 500 are separated from one another (in contrast to the example of FIGS. 6A and 6B). Additionally, the spiral shapes of the first and second heater elements 490, 500 are radially offset relative to one another along the axial direction. As such, the heater elements 470, 480 may be considered "staggered spirals". As noted above, any suitable shape or combination of shapes may be provided to effectively heat the exhaust uniformly across the exhaust flow cross-section.

Accordingly, embodiments discussed herein provides an integrated reductant mixer and heater apparatus within the SCR system to heat and distribute the exhaust flow to enhance the effectiveness and efficiency of the exhaust treatment system, reduce or eliminate solid deposits, mitigate pressure loss, and avoid of inefficient reductant use. These advantages may be provided with a significant reduction in space and cost relative to other designs. Additionally, the examples described above may enable the engine to operate at elevated temperatures to achieve improved fuel economy, even while maintaining or reducing emission levels of pollutants. Generally, the embodiments above provide of example configurations and arrangements of exhaust treatment systems. However, the description above is generally applicable to any type of exhaust treatment system.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the following examples are provided, which are numbered for easier reference.

1. An integrated reductant mixer and heater apparatus for an exhaust treatment system, comprising: a housing having a housing wall that defines a housing interior for an exhaust stream to flow therethrough in an axial flow direction coaxial with the housing interior; a reductant injector coupled to the housing and configured to deliver a spray of reductant into the exhaust stream; at least one mixing fin disposed within the housing interior downstream of the reductant injector, the mixing fin having a primary deflection surface orientated parallel with, or at an acute angle relative to, the axial flow direction; a first heater element within the housing interior and extending within a first plane intersecting the axial flow direction proximate the primary deflection surface of the mixing fin; and a second heater element within the housing interior and extending within a second plane intersecting the axial flow direction proximate the primary deflection surface of the mixing fin and downstream from the first heater element.

2. The integrated reductant mixer and heater apparatus of claim 1, wherein at least one of the first heater element and the second heater element is completely upstream of the at least one mixing fin.

3. The integrated reductant mixer and heater apparatus of claim 1, wherein each of the first heater element and the second heater element is completely upstream of the at least one mixing fin.

4. The integrated reductant mixer and heater apparatus of claim 1, wherein the at least one mixing fin has an axial position to radially overlap the second heater element.

5. The integrated reductant mixer and heater apparatus of claim 1, wherein the at least one mixing fin has an axial position to radially overlap the first heater element and the second heater element.

6. The integrated reductant mixer and heater apparatus of claim 1, wherein each of the first heater element and the second heater element is an electric heater element.

7. The integrated reductant mixer and heater apparatus of claim 1, wherein each of the first heater element and the second heater element is formed with a wave shape.

8. The integrated reductant mixer and heater apparatus of claim 7, wherein the first heater element and the second heater element are radially offset relative to one another along the axial flow direction.

9. The integrated reductant mixer and heater apparatus of claim 1, wherein each of the first heater element and the second heater element is formed with a spiral shape.

10. The integrated reductant mixer and heater apparatus of claim 9, wherein the first heater element and the second heater element are radially offset relative to one another along the axial flow direction.

11. The integrated reductant mixer and heater apparatus of claim 1, wherein the first heater element and the second heater element collectively extend across the axial flow direction to effectively heat substantially all of the exhaust stream.

12. The integrated reductant mixer and heater apparatus of claim 1, further comprising a controller configured to modulate temperatures the first heater element and the second heater element.

13. An exhaust treatment system for treating exhaust from an engine, comprising: an inlet tube for receiving the exhaust from the engine; a particulate filter fluidly coupled to receive the exhaust from the inlet tube; a selective catalytic reduction system coupled to receive the exhaust from the particulate filter, wherein the selective catalytic reduction system comprises: an integrated reductant mixer and heater housing having a housing wall that defines a housing interior for an exhaust stream to flow therethrough in an axial flow direction coaxial with the housing interior; a reductant injector coupled to the housing and configured to deliver a spray of reductant into the exhaust stream; at least one mixing fin disposed within the housing interior downstream of the reductant injector, the mixing fin having a primary deflection surface orientated parallel with, or at an acute angle relative to, the axial flow direction; a first heater element within the housing interior and extending within a first plane intersecting the axial flow direction proximate the primary deflection surface of the mixing fin; and a second heater element within the housing interior and extending within a second plane intersecting the axial flow direction proximate the primary deflection surface of the mixing fin and downstream from the first heater element; and a catalyst device fluidly coupled to receive the mixture of the reductant and the exhaust from the integrated reductant mixer and heater housing and configured to reduce NOx in the exhaust with the reductant; and an outlet tube coupled to receive the exhaust from the selective catalytic reduction system.

14. The exhaust treatment system of claim 13, wherein the at least one mixing fin has an axial position to radially overlap the second heater element.

15. The exhaust treatment system of claim 13, wherein each of the first heater element and the second heater element is an electric heater element.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An integrated reductant mixer and heater apparatus for an exhaust treatment system, comprising:
   a housing having a housing wall that defines a housing interior for an exhaust stream to flow therethrough in an axial flow direction coaxial with the housing interior;
   a reductant injector coupled to the housing and configured to deliver a spray of reductant into the exhaust stream;
   at least one mixing fin disposed within the housing interior downstream of the reductant injector, the mixing fin having a primary deflection surface orientated at least in part at an acute angle relative to the axial flow direction;
   a first heater element within the housing interior and extending within a first plane intersecting the axial flow direction proximate the primary deflection surface of the mixing fin; and
   a second heater element within the housing interior and extending within a second plane intersecting the axial flow direction proximate the primary deflection surface of the mixing fin and downstream from the first heater element; wherein the at least one mixing fin has an axial position to radially overlap the first heater element and the second heater element.

2. The integrated reductant mixer and heater apparatus of claim 1, wherein each of the first heater element and the second heater element is an electric heater element.

3. The integrated reductant mixer and heater apparatus of claim 1, wherein each of the first heater element and the second heater element is formed with a wave shape.

4. The integrated reductant mixer and heater apparatus of claim 3, wherein the first heater element and the second heater element are radially offset relative to one another along the axial flow direction.

5. The integrated reductant mixer and heater apparatus of claim 1, wherein each of the first heater element and the second heater element is formed with a spiral shape.

6. The integrated reductant mixer and heater apparatus of claim 5, wherein the first heater element and the second heater element are radially offset relative to one another along the axial flow direction.

7. The integrated reductant mixer and heater apparatus of claim 1, wherein the first heater element and the second heater element collectively extend across the axial flow direction to effectively heat substantially all of the exhaust stream.

8. The integrated reductant mixer and heater apparatus of claim 1, further comprising a controller configured to modulate temperatures the first heater element and the second heater element.

9. An exhaust treatment system for treating exhaust from an engine, comprising:
   an inlet tube for receiving the exhaust from the engine;
   a particulate filter fluidly coupled to receive the exhaust from the inlet tube;
   a selective catalytic reduction system coupled to receive the exhaust from the particulate filter, wherein the selective catalytic reduction system comprises:
      an integrated reductant mixer and heater housing having a housing wall that defines a housing interior for an exhaust stream to flow therethrough in an axial flow direction coaxial with the housing interior;

a reductant injector coupled to the housing and configured to deliver a spray of reductant into the exhaust stream;

at least one mixing fin disposed within the housing interior downstream of the reductant injector, the mixing fin having a primary deflection surface orientated parallel with, or at an acute angle relative to, the axial flow direction at least in part at an acute angle relative to a first heater element within the housing interior and extending within a first plane intersecting the axial flow direction proximate the primary deflection surface of the mixing fin; and a second heater element within the housing interior and extending within a second plane intersecting the axial flow direction proximate the primary deflection surface of the mixing fin and downstream from the first heater element; wherein the at least one mixing fin has an axial position to radially overlap the first heater element and the second heater element; and a catalyst device fluidly coupled to receive the mixture of the reductant and the exhaust from the integrated reductant mixer and heater housing and configured to reduce NOx in the exhaust with the reductant; and an outlet tube coupled to receive the exhaust from the selective catalytic reduction system.

10. The exhaust treatment system of claim 9, wherein each of the first heater element and the second heater element is an electric heater element.

11. The exhaust treatment system of claim 9, wherein each of the first heater element and the second heater element is formed with a wave shape.

12. The exhaust treatment system of claim 9, wherein each of the first heater element and the second heater element is formed with a spiral shape.

13. The exhaust treatment system of claim 9, wherein the first heater element and the second heater element collectively extend across the axial flow direction to effectively heat substantially all of the exhaust stream.

* * * * *

UNITED STATES PATENT AND TRADEMARK OFFICE
CERTIFICATE OF CORRECTION

| | |
|---|---|
| PATENT NO. | : 10,961,887 B2 |
| APPLICATION NO. | : 16/502650 |
| DATED | : March 30, 2021 |
| INVENTOR(S) | : Huang et al. |

Page 1 of 1

It is certified that error appears in the above-identified patent and that said Letters Patent is hereby corrected as shown below:

In the Claims

In Column 15, Claim 9, Lines 9-11, delete "parallel with, or at an acute angle relative to, the axial flow direction at least in part at an acute angle relative to" and insert -- at least in part at an acute angle relative to the axial flow direction; --, therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*